(12) United States Patent
Sato et al.

(10) Patent No.: US 8,638,514 B2
(45) Date of Patent: Jan. 28, 2014

(54) INFORMATION RECORDING DEVICE AND INFORMATION RECORDING METHOD

(75) Inventors: Akihiko Sato, Hamura (JP); Tatsuya Haga, Ome (JP)

(73) Assignee: Kabushiki Kaisha Toshiba (JP)

( * ) Notice: Subject to any disclaimer, the term of this patent is extended or adjusted under 35 U.S.C. 154(b) by 50 days.

(21) Appl. No.: 13/401,709

(22) Filed: Feb. 21, 2012

(65) Prior Publication Data

US 2012/0212847 A1 Aug. 23, 2012

(30) Foreign Application Priority Data

Feb. 23, 2011 (JP) .................................. 2011-037604

(51) Int. Cl.
*G11B 7/00* (2006.01)

(52) U.S. Cl.
USPC .......................................... 360/48; 360/77.01

(58) Field of Classification Search
USPC ........... 369/275.3; 360/60, 59, 48, 31, 39, 63, 360/77.01, 75
See application file for complete search history.

(56) References Cited

U.S. PATENT DOCUMENTS

| 7,486,460 | B2 * | 2/2009 | Tsuchinaga et al. ............ 360/48 |
| 7,522,366 | B2 | 4/2009 | Mettler et al. |
| 7,724,459 | B2 * | 5/2010 | Czarnecki et al. ............. 360/63 |
| 7,729,071 | B2 | 6/2010 | Harada |
| 7,774,539 | B2 | 8/2010 | Mettler et al. |
| 7,965,465 | B2 * | 6/2011 | Sanvido et al. ................. 360/60 |
| 8,068,299 | B2 * | 11/2011 | Tsunokawa et al. ............ 360/39 |
| 8,385,157 | B1 * | 2/2013 | Champion et al. ......... 369/13.01 |
| 2008/0130154 | A1 | 6/2008 | Mettler et al. |
| 2008/0151704 | A1 | 6/2008 | Harada |
| 2008/0189469 | A1 | 8/2008 | Mettler et al. |
| 2008/0239901 | A1 | 10/2008 | Tsunokawa et al. |
| 2011/0304939 | A1 * | 12/2011 | Hirata et al. .................. 360/110 |

FOREIGN PATENT DOCUMENTS

| JP | 2005-251235 | 9/2005 |
| JP | 2008-140534 | 6/2008 |
| JP | 2008-159184 | 7/2008 |
| JP | 2008-192279 | 8/2008 |
| JP | 2008-243269 | 10/2008 |

* cited by examiner

*Primary Examiner* — Nabil Hindi
(74) *Attorney, Agent, or Firm* — Knobbe, Martens, Olson and Bear, LLP

(57) ABSTRACT

According to one embodiment, an information recording device includes: a magnetic recording medium having tracks; and a recording controller configured to control recording of information on a track provided between a first track group and a second track group adjacent to the first track group, the first track group and the second track group being included in a plurality of track groups, each of which includes a plurality of adjacent tracks partially overlap each other.

8 Claims, 5 Drawing Sheets

US 8,638,514 B2

INFORMATION RECORDING DEVICE AND INFORMATION RECORDING METHOD

CROSS REFERENCE TO RELATED APPLICATION(S)

The application is based upon and claims the benefit of priority from Japanese Patent Application No. 2011-037604 filed on Feb. 23, 2011, the entire contents of which are incorporated herein by reference.

BACKGROUND

1. Field

Embodiments of the present invention relate to an information recording device and an information recording method for recording information onto a recording medium.

2. Description of the Related Art

In recent years, various technologies have been developed for realizing an increased storage capacity of a magnetic disc device (hereinafter, also referred to as HDD) as an example of the information recording device. Among these is a recording technology called "shingled write recording". The shingled write recording is a recording method in which, when information is recorded onto a magnetic disc, a recording track is recorded so as to overlap part of an adjacent track. The adoption of the shingled write recording enables the TPI (track per inch) to be further improved.

In the shingled write recording, track groups (hereinafter, also referred to as bands) each including a plurality of adjacent tracks are defined as recording units. Moreover, at least one information recordable band is reserved as a spare band. When information recorded in a band is updated (rewritten), the information to be updated is rewritten not to the band from which the information is read but to the spare band. Then, the band where the information to be updated was recorded is used as a new spare band. That is, in the shingled write recording, the position of the spare band moves from one place to another.

Moreover, with the HDD, a problem called ATI (adjacent track interference) that influences the retention of information of a track adjacent to a recording track sometimes occurs due to a magnetic interference from the recording track. There are cases where the stored information is destroyed by the ATI. For example, the higher the TPI is as in the shingled write recording, the more significant the problem of ATI is. Therefore, it has been performed to make the width of the track at the boundary with the adjacent band wider than that of the other tracks included in this band to thereby avoid the influence of the ATI on the boundary track from the adjacent track of the adjacent band. In other words, there are cases where the track at the boundary with the adjacent band has a structure including a track having the same width as the other tracks included in this band and a protective track having a predetermined width.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

DETAILED DESCRIPTION

According to one embodiment, an information recording device includes: a magnetic recording medium having tracks; and a recording controller configured to control recording of information on a track provided between a first track group and a second track group adjacent to the first track group, the first track group and the second track group being included in a plurality of track groups, each of which includes a plurality of adjacent tracks partially overlap each other.

Hereinafter, a first embodiment will be described by using the drawings.

Figure 1:
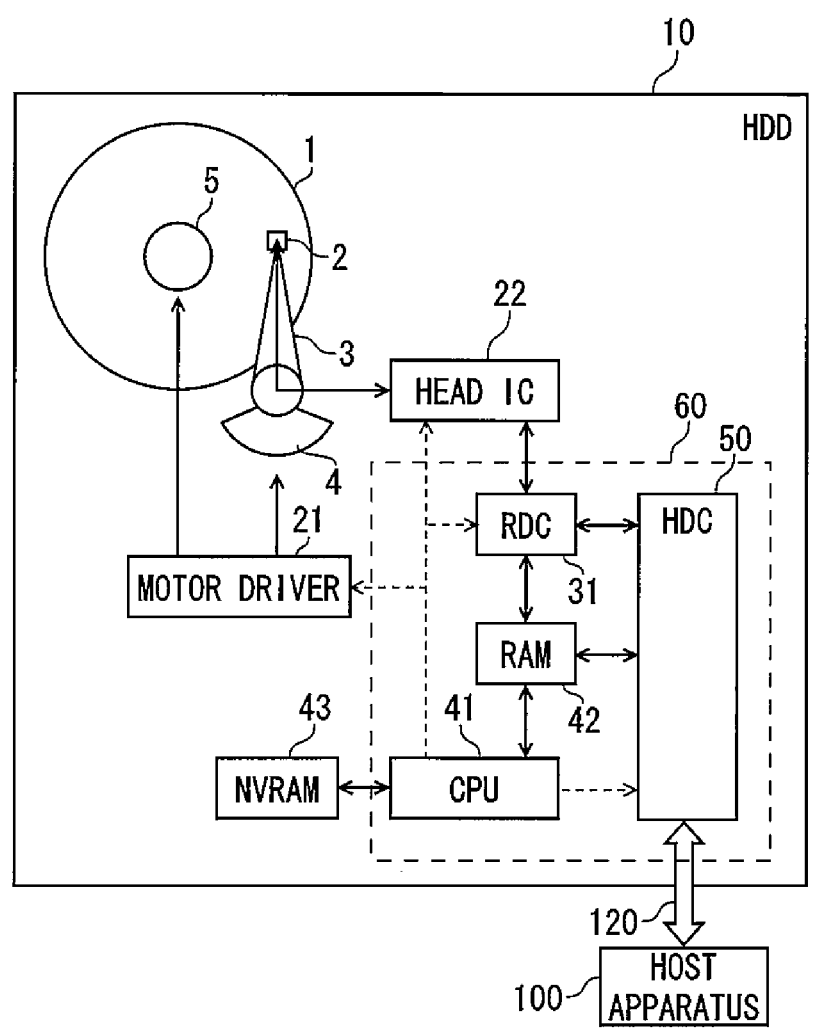
FIG. 1 is a block diagram showing the structure of an electronic apparatus provided with a magnetic disc device (HDD) as an information recording device according to a first embodiment.

FIG. 1 is a block diagram showing the structure of an electronic apparatus 150 provided with a magnetic disc device (hereinafter, also referred to as HDD) 10 as an information recording device according to the first embodiment. Moreover, the electronic apparatus 150 is provided with a host apparatus 100. The HDD 10 is connected to the host apparatus 100 through a communication medium (host I/F) 120, and functions as a storage module of the host apparatus 100. The host I/F 120 connects the host apparatus 100 and the HDD 10, and is used for communications related to data and command transmission and reception between the host apparatus 100 and the HDD 10. For example, the electronic apparatus 150 is a personal computer, and the host apparatus 100 is a chip set IC provided in the personal computer.

The HDD 10 according to the first embodiment has mechanical portions such as a magnetic disc 1, a slider 2, an arm 3, a VCM (voice coil motor) 4, and an SPM (spindle motor) 5. Moreover, the HDD 10 is provided with circuitry blocks such as a motor driver 21, a head IC 22, an NVRAM 43, and a controller 60. The controller 60 includes a read/write channel IC (hereinafter, also referred to as RDC) 31, a CPU 41, a RAM 42, and an HDC (hard disc controller) 50.

In the HDD 10 according to the first embodiment, information is recorded onto the recording surface of the magnetic disc 1 by a write head (not shown) provided on the slider 2. A recording method called shingled write recording is applied to the information recording onto the recording surface of the magnetic disc 1. The shingled write recording is a recording method in which the tracks defined on the magnetic disc 1 are recorded so as to be overlapped by part of adjacent tracks (partially overwritten). In the shingled write recording, track groups (hereinafter, also referred to as bands) each including a plurality of adjacent tracks are defined as recording units. It is impossible to re-write only a target track among a plurality of overlapping tracks related to a band, and at least the tracks overlapped after the target track are rewritten.

Moreover, in the first embodiment, at least one track is provided between a band and a band adjacent to the band. The track provided between the bands is provided to further reduce the influence of the ATI (adjacent track interference) between the tracks on both sides of this track. The ATI where a certain track influences the retention of information of the track adjacent to the certain track is a problem caused by a magnetic interference. Moreover, this track is not used for retaining the data transmitted from the host apparatus 100 but is used for other uses. By this track provided between the bands, the HDD 10 according to the first embodiment to which the shingled write recording using track groups as recording units is applied can effectively use the track provided between the adjacent track groups.

The magnetic disc 1 is fixed to the SPM 5, and rotates by rotary drive of the SPM 5. At least one surface of the magnetic disc 1 is a recording surface on which information is magnetically recorded. That is, the magnetic disc 1 is a magnetic recording medium. On the recording surface, a plurality of tracks that are, for example, concentric are defined, and each track has a servo area and a data area. In the servo area, information on the physical address on the recording surface of the magnetic disc 1 is recorded. The information to be recorded on the HDD 10 is recorded in the data area. In the first embodiment, the shingled write recording is applied as the method of information recording to the data area of the magnetic disc 1. On the recording surface of the magnetic disc 1, a plurality of bands each including a plurality of tracks are defined. At least one track is provided between a band and a band adjacent to the band. In the description provided hereafter, the track provided between the bands will also be referred to as a boundary track.

The slider 2 is provided at one end of the arm 3 in correspondence to the recording surface of the magnetic disc 1. The slider 2 is provided with a read head (not shown) and a write head (not shown). The read head (not shown) reads signals magnetically recorded on the recording surface of the magnetic disc 1. The read signals are outputted to the head IC 22 through a conductive pattern on the arm 3. The write head (not shown) performs magnetic recording onto the recording surface of the magnetic disc 1 in response to the write signal (write current) inputted from the head IC 22 through the conductive pattern on the arm 3.

The arm 3 is provided with the slider 2 at one end and a bearing portion (not shown) at the other end. The arm 3 rotates about the bearing portion (not shown) in response to the supply of drive current to the VCM 4, and moves the slider 2 in the radial direction on the recording surface of the magnetic disc 1.

The VCM 4 is driven in response to a drive signal (current) supplied from the motor driver 21, and rotates the arm 3.

The SPM 5 is driven in response to a drive signal (current) supplied from the motor driver 21, and rotates the magnetic disc 1.

The motor driver 21 supplies the drive signal (current) for driving the VCM 4 to the VCM 4 and supplies the drive signal (current) for driving the SPM 5 to the SPM 5 based on a control signal from the controller 60 (more specifically, the CPU 41).

The head IC 22 amplifies a signal inputted from the read head (not shown) provided on the slider 2 through the conductive pattern on the arm 3, and outputs the amplified signal to the controller 60 (more specifically, the RDC 31) as read information. Moreover, the head IC 22 outputs a write signal (write current) responsive to the recording information inputted from the controller 60 (RDC 31), to the write head (not shown) provided on the slider 2 through the conductive pattern on the arm 3.

The controller 60 is structured as an SoC (system on chip) including the RDC 31, the CPU 41, the RAM 42 and the HDC 50. A structure may be adopted in which the controller 60 does not include the RAM 42 and the RAM 42 is connected to the outside of the controller 60. The controller 60 performs information recording processing of recording information to a plurality of bands defined on the recording surface of the magnetic disc 1 and the boundary track.

The RDC 31 decodes the read information inputted from the head IC 22 by performing predetermined processing thereon, and outputs the decoded information to the HDC 50. Moreover, the RDC 31 codes the information to be recorded inputted from the HDC 50 by performing predetermined processing thereon, and outputs the coded information to the head IC 22 as recording information. The RDC 31 detects a servo section representative of the servo area from the read information, and extracts position information from the signal in the detected servo section. The extracted position information is outputted to the CPU 41. The RDC 31 uses the RAM 42 as the working memory for these processings.

The CPU 41 is a processor that controls the blocks provided in the HDD 10 by executing programs stored in the NVRAM 43. For example, the CPU 41 controls the processing of rotation control of the VCM 4 and the SPM 5 and the processing of information recording onto the magnetic disc 1. In the first embodiment, the CPU 41 executes a program that allows the controller 60 to operate as a servo controller or a readYwrite controller. When the controller 60 operates as a read/write controller, information is recorded onto the magnetic disc 1 by the shingled write recording. Moreover, in information recording, the controller 60 manages information related to information recording to a plurality of bands defined on the recording surface of the magnetic disc 1. In such program execution, the CPU 41 uses the RAM 42 as the working memory.

The RAM 42 is the working memory of the RDC 31, the CPU 41 and the HDC 50. To the RAM 42, a DRAM which is a nonvolatile memory is applied.

The NVRAM 43 is a nonvolatile memory that stores programs executed by the CPU 41. The programs stored in the NVRAM 43 are updatable. Moreover, the NVRAM 43 stores parameter values used in the processings executed by the CPU 41.

The HDC 50 executes communication processing of transmitting and receiving information to and from the host apparatus 100. The HDC 50 codes the decoded information inputted from the RDC 31 by performing predetermined processing thereon, and transmits the coded information to the host apparatus 100 as transmission information. Moreover, the HDC 50 decodes the reception information received from the host apparatus 100 by performing predetermined processing thereon, and outputs the decoded information to the RDC 31 as information to be recorded. For example, the HDC 50 executes communication processing conforming to the SATA (Serial Advanced Technology Attachment) standard with the host apparatus 100. When a write command including information on the logical address where data recording is started and the recording data length is received from the host apparatus 100, the HDC 50 extracts the information on the logical address and the recording data length from the received write command. The extracted information on the logical address and the recording data length is outputted to the CPU 41.

With the above-described structure, by a plurality of blocks provided in the HDD 10 according to the first embodiment, information is recorded onto the magnetic disc 1 in units of bands each including a plurality of tracks by the shingled write recording method. On the recording surface of the magnetic disc 1, at least one boundary track is provided between a band and a band adjacent to the band. By using this boundary track, in the HDD 10 according to the first embodiment to which the shingled write recording using track groups as recording units is applied, the track provided between the adjacent track groups can be effectively used.

Next, a mode of the shingled write recording, executed in the HDD 10 according to the first embodiment, in which track groups are used as recording units and the effectively used boundary track is provided between the adjacent track groups will be described by using FIG. 2.

Figure 2:
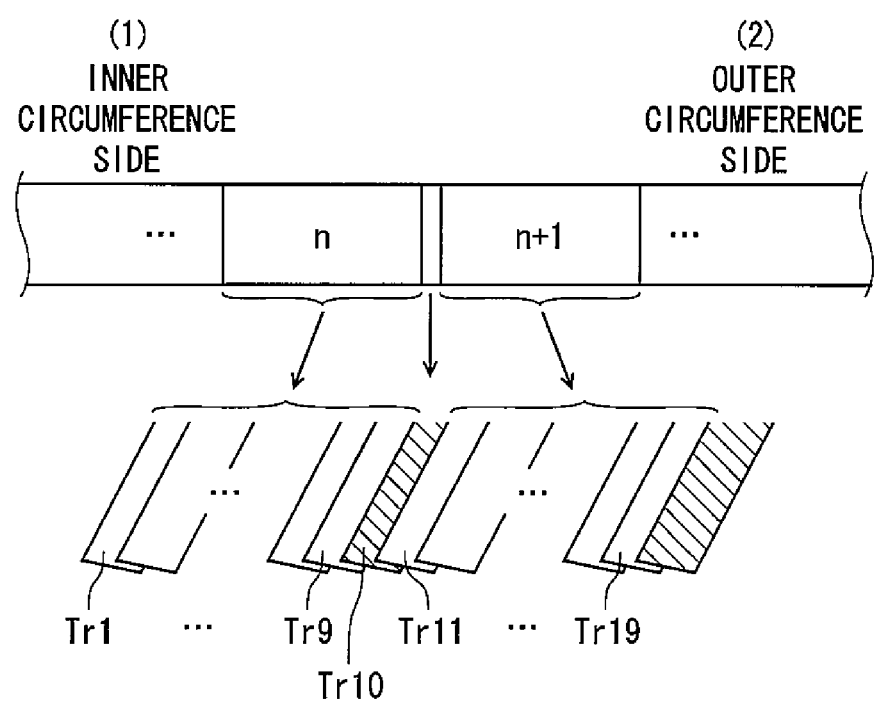
FIG. 2 is a conceptual view for explaining a mode of the shingled write recording, executed in the HDD according to the first embodiment, in which track groups are used as recording units and the effectively used boundary track is provided between the adjacent track groups.

FIG. 2 is a conceptual view for explaining the mode of the shingled write recording, executed in the HDD 10 according to the first embodiment, in which track groups are used as recording units and the effectively used boundary track is provided between the adjacent track groups.

As in the conceptual view shown in FIG. 2, an inner circumference side and an outer circumference side are defined on the recording surface of the magnetic disc 1. On the recording surface, a plurality of bands n, n+1, . . . each including a plurality of tracks are disposed from the inner circumference side toward the outer circumference side. While the plurality of bands n, n+1, . . . are each assigned with an identifier for managing the band, the order of the identifiers is not always ascending order from the inner circumference side toward the outer circumference side. The band n includes a plurality of tracks Tr1, . . . , and Tr9, and the band n+1 includes a plurality of tracks Tr11, . . . , and Tr19.

In the band n, since information is recorded by the shingled write recording, recording is performed in such a way that the track Tr2 overlaps part of the track Tr1. The track Tr2 is a track adjacent to the track Tr1. The same description applies to the other tracks of the band n and a plurality of tracks of the band n+1. A boundary track Tr10 is provided between the band n and the band n+1. The boundary track Tr10 is recorded in such a way as to overlap part of the track Tr9. Moreover, the track Tr11 is recorded in such a way as to overlap part of the boundary track Tr10. The boundary track 10 is a track adjacent to the tracks Tr9 and Tr11. While in the first embodiment, information recording processing is performed in units of band by the shingled write recording as described above, exceptionally, to the boundary track provided between bands, information is recorded not in units of bands but in units of tracks.

The boundary track Tr10 provided between the band n and the band n+1 is not included in either the band n or the band n+1. Moreover, the boundary track Tr10 is not used for retaining the data transmitted from the host apparatus 100. The information recorded on the boundary track Tr10 is information independent of the information recorded in the band n and the band n+1. The provision of the boundary track Tr10 enables further reduction of the influence of the ATI on the track Tr9 from the track Tr11 recorded first among a plurality of tracks included in the band n+1 by the shingled write recording. In the first embodiment, the boundary track Tr10 is effectively used not only for further reducing the influence of the ATI but also for other uses.

While the bands n, n+1, . . . are track groups each including nine tracks in the description using this conceptual view, the number of tracks included in each band is not limited to nine. Moreover, while the number of boundary tracks between the band n and the band n+1 is one in this conceptual view, it may be two or more.

By providing the boundary track used for a plurality of uses between a track group as a recording unit of the shingled write recording and a track group adjacent to the track group as described above, in the HDD 10 according to the first embodiment, the track provided between the adjacent track groups can be effectively used in the shingled write recording.

Next, a first concrete example of the use of the boundary track applied in the first embodiment will be described by using FIG. 3.

Figure 3:
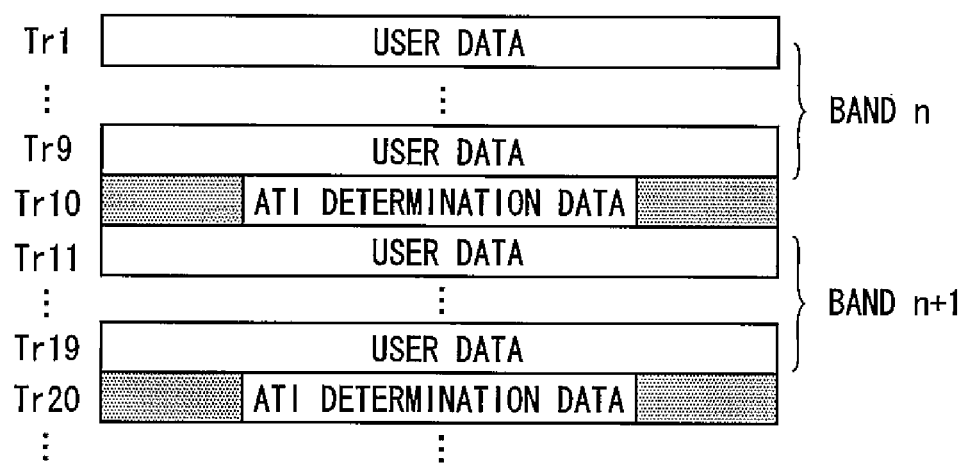
FIG. 3 is a conceptual view for explaining a first concrete example of the use of the boundary track applied in the first embodiment.

FIG. 3 is a conceptual view for explaining the first concrete example of the use of the boundary track applied in the first embodiment.

As described above, on the magnetic disc 1 provided in the HDD 10 according to the first embodiment, the boundary track Tr10 is provided between the band n including a plurality of tracks Tr1 to Tr9 and the band n+1 including a plurality of tracks Tr11 to Tr19. In the first embodiment, the boundary track Tr10 is used for determining the influence of the ATI on the track Tr9 from the track Tr11 as well as for further reducing the influence of the ATI.

ATI determination data is recorded on the boundary track Tr10. The ATI determination data is not special data. For example, the ATI determination data may be data having a specific repetitive signal pattern, data with which the error rate can be measured, data with which the VMM (Viterbi Metrics Margin) can be determined, or the like. It is unnecessary to prepare such ATI determination data in the HDD 10. For example, data of an amount corresponding to the data amount of the boundary track Tr10 which data is extracted from part of the data transmitted from the host apparatus 100 may be used.

The ATI determination data recorded on the boundary track Tr10 is read at a predetermined time. By evaluating the read ATI determination data, it can be determined whether the influence of the ATI on the track Tr9 from the track Tr11 is caused or not. For example, when the ATI determination data is data having a specific repetitive signal pattern, the determination can be made by evaluating whether the specific repetitive signal pattern is correctly read or not. When the ATI determination data is data with which the error rate can be measured, data with which the VMM can be determined, or the like, the determination can be made by an evaluation by a comparison with a predetermined error rate or VMM value.

In this way, in the first embodiment, the boundary track Tr10 is used for determining the influence of the ATI as well as for further reducing the influence of the ATI. Thus, in the HDD 10 according to the first embodiment, the track provided between the adjacent track groups can be effectively used in the shingled write recording.

Next, the operation of the shingled write recording processing on the bands and the boundary track which operation is executed in the HDD 10 according to the first embodiment will be described by using FIG. 4.

Figure 4:
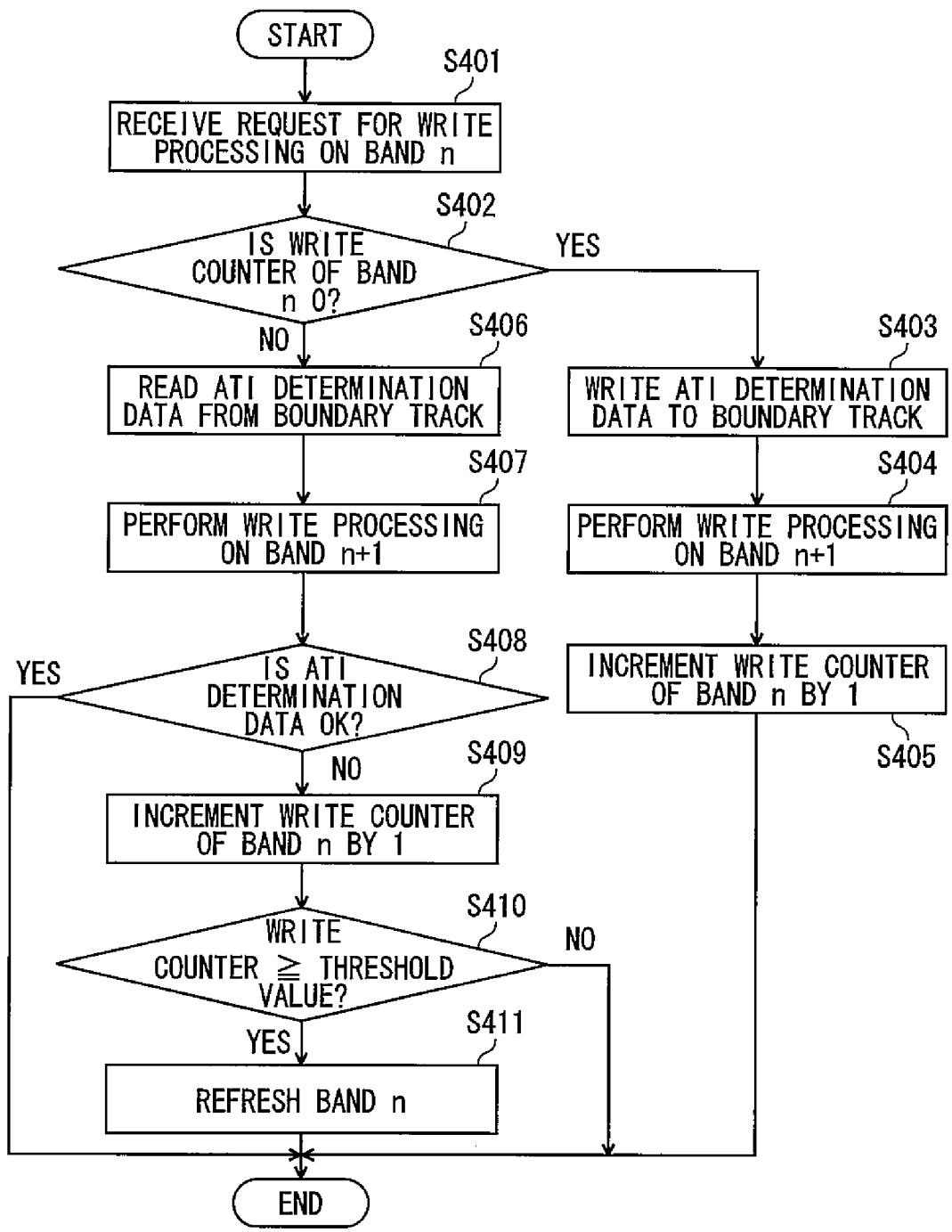
FIG. 4 is a flowchart for explaining the operation of the shingled write recording processing on the bands and the boundary track which operation is executed in the HDD according to the first embodiment.

FIG. 4 is a flowchart for explaining the operation of the shingled write recording processing on the bands and the boundary track which operation is executed in the HDD 10 according to the first embodiment.

The operation by the flowchart of FIG. 4 is applied in a mode in which the adjacent track Tr10 is provided between the band n and the band n+1 as in the conceptual view shown in FIG. 3. With the band n, a write counter is associated. The write counter associated with the band n is a value updated in response to information recording to the band n or the band n+1. While a write counter is similarly associated with the band n+1, in the following description, the processing on the write counter of the band n will be described.

After information is recorded to the band n, the write counter associated with the band n is cleared to "0". This is because even if the condition is such that the influence of the ATI is likely to occur on the band n, the new recording to the band n brings about a condition where the band n is uninfluenced by the ATI. The operation by the flowchart of FIG. 4 is started under a condition where information has already been recorded in the band n in the conceptual view shown in FIG. 3 and the write counter associated with the band n is "0".

When a request for write processing on the band n+1 is received (S401), it is determined whether the write counter associated with the band n (hereinafter, also referred to as write counter Bn) is "0" or not (S402). When the write counter Bn is "0" (Yes of S402), the ATI determination data is recorded to the boundary track Tr10 (S403). Thereafter, the requested write processing is executed on the band n+1 (S404), and the write counter Bn is incremented by one, that is, becomes "1" (S405). Then, the response to the request for the write processing on the band n+1 is finished.

On the other hand, when the write counter Bn is not "0" (No of S402), the ATI determination data recorded on the boundary track Tr10 is read (S406), and the requested write processing is executed on the band n+1 (S407). Then, the read ATI determination data is evaluated (S408). When there is no problem with the read ATI determination data as a result of the evaluation (Yes of S408), the response to the request for the write processing on the band n+1 is finished.

On the other hand, when there is a problem with the read ATI determination data (No of S408), the write counter Bn is incremented by one (S409). Thereafter, it is determined whether or not the incremented write counter Bn is higher than or equal to a predetermined threshold value (S410). When it is higher than or equal to the threshold value (Yes of S410), the information recorded in the band n is read and re-recorded (S411). That is, the information recorded in the band n is refreshed. After the refreshing on the band n, the response to the request for the write processing on the band n+1 is finished. When the write counter Bn is not higher than or equal to the threshold value (No of S410), the response to the request for the write processing on the band n+1 is also finished.

By such a procedure, the shingled write recording processing on the bands and the boundary track by the HDD 10 according to the first embodiment is executed. In this processing, the boundary track provided between the adjacent bands is used for determining the influence of the ATI between the bands as well as for further reducing the influence of the ATI. Moreover, in this processing, the subsequent operation is determined according to the value of the write counter associated with the band n and the result of the evaluation of the ATI determination data read from the boundary track. That is, in the HDD 10 according to the first embodiment, the track provided between the adjacent tracks can be effectively used in the information recording device to which the shingled write recording using track groups as recording units is applied.

Hereinafter, a second embodiment will be described by using mainly FIG. 5.

The second embodiment is implemented as an information recording device to which the block diagram shown in FIG. 1 is applied. In the information recording device according to the second embodiment, the mode of the shingled write recording as in the conceptual view shown in FIG. 2 is also applied. In the second embodiment, the use of the boundary track is different from that of the first embodiment. Therefore, this difference will be described in detail hereafter.

Figure 5:
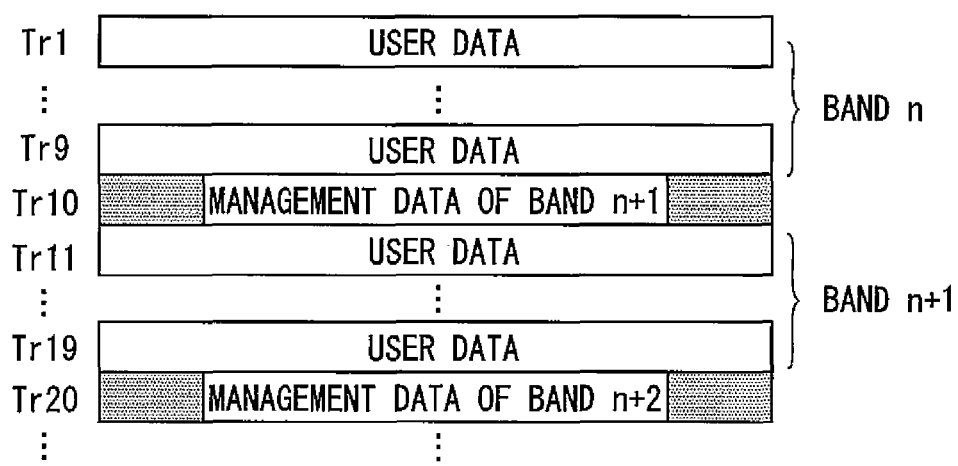
FIG. 5 is a conceptual view for explaining a second concrete example of the use of the boundary track applied in a second embodiment.

FIG. 5 is a conceptual view for explaining a second concrete example of the use of the boundary track applied in the second embodiment.

In the magnetic disc 1 provided in the HDD 10 according to the second embodiment, the boundary track 10 is also provided between the band n including a plurality of tracks Tr1 to Tr9 and the band n+1 including a plurality of tracks Tr11 to Tr19. In the second embodiment, the boundary track Tr10 is used for storing the management data related to the band n+1 as well as for further reducing the influence of the ATI on the track Tr9 from the track Tr11. That is, the management data related to the band n+1 is stored on the boundary track Tr10. Moreover, an adjacent track Tr20 used for storing the management data related to the band n+2 is provided next to the track Tr19 of the band n+1. Further, the adjacent track Tr20 is also used for further reducing the influence of the ATI on the track Tr19 from the track Tr21.

The management data is data representative of information such as whether the band n+1 is a spare band or not, the logical address of the data recorded in the band n+1 and the logical recording order of the band n+1. The spare band is defined as a band where new information is recordable. In the shingled write recording, basically, at least one spare band is always reserved. In the shingled write recording, when recording of new information is requested, the new information is recorded in the spare band. Moreover, when data recorded in a certain band is rewritten, the data recorded in the certain band is copied to the spare band, and the certain band is changed to a spare band. That is, the data recorded in the spare band is invalid data.

For example, when a certain band is changed to a spare band, data representing that the certain band is a spare band is recorded onto the adjacent track where the management data related to the certain band is recorded. This makes it possible to grasp that the certain band is a spare band only by recording and reproduction to and from the adjacent track. By recording the logical recording order of a certain band in the management data, it can be grasped that the band with the highest recording order is formerly a spare band. Further, a case is assumed where the logical address of data recorded in a band is recorded and the data recorded in the band is rewritten. In this case, by updating the management data of the band to rewrite the data to, copying the data of the band to rewrite the data to and then, updating the management data of the band where the data is originally recorded, for example, even if recording results in a failure in the rewriting of any of the data, since the original data is retained by being recorded in any of the bands, this data can be restored by following the logical address.

In this way, in the second embodiment, the boundary track is used for recording the management data related to the band as well as for further reducing the influence of the ATI. Thus, in the HDD 10 according to the second embodiment, the track provided between the adjacent track groups can be effectively used in the shingled write recording.

As described above, according to a plurality of embodiments, information is recorded onto the magnetic disc 1 by the shingled write recording where the adjacent track is provided between the bands. In this processing, the boundary track is used not only for further reducing the influence of the ATI between the bands but also for other uses. By thus using the adjacent track for a plurality of uses, the recording surface of the magnetic disk can be effectively used. That is, according to the HDD 10 of the embodiments, the track provided between the adjacent track groups can be effectively used in the shingled write recording.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information recording device comprising:
   a magnetic recording medium comprising tracks; and
   a recording controller configured to control recording of information on a first track between a first track group and a second track group adjacent to the first track group, the first track group and the second track group being among a plurality of track groups, each track group comprising a plurality of adjacent tracks configured to partially overlap with each other,
   wherein the first track is recorded to overlap on a portion of a second track, closest to the first track, among the plurality of tracks included in the first track group, and to be overlapped by a portion of a third track, closest to the first track, among the plurality of tracks included in the second track group,
   wherein the information comprises information independent of information recorded in the first track group and information recorded in the second track group, and
   wherein the information comprises information for evaluating an influence of magnetic interference between the first and second track groups, or wherein the information comprises management information related to the second track group.

2. The information recording device according to claim 1, wherein the first track provided between the first track group and the second track group is configured to reduce the magnetic interference between the first track group and the second track group.

3. An information recording method by an information recording device that comprises a magnetic recording medium comprising tracks, the method comprising:
   controlling recording of information on a first track between a first track group and a second track group adjacent to the first track group, the first track group and the second track group being among a plurality of track groups, each track group comprising a plurality of adjacent tracks configured to partially overlap with each other,
   wherein the first track is recorded to overlap on a portion of a second track, closest to the first track, among the plurality of tracks included in the first track group, and to be overlapped by a portion of a third track, closest to the first track, among the plurality of tracks included in the second track group,
   wherein the information comprises information independent of information recorded in the first track group and information recorded in the second track group, and
   wherein the information comprises information for evaluating an influence of magnetic interference between the first and the second track groups, or wherein the information comprises management information related to the second track group.

4. The information recording device according to claim 3, wherein the first track provided between the first track group and the second track group is configured to reduce the magnetic interference between the first track group and the second track group.

5. An information recording method by an information recording device that comprises a magnetic recording medium comprising tracks, the method comprising:
   controlling recording of information on a first track between a first track group and a second track group adjacent to the first track group, the first track group and the second track group being among a plurality of track groups, each track group comprising a plurality of adjacent tracks configured to partially overlap with each other,
   wherein the information comprises information for evaluating an influence of magnetic interference between the first and the second track groups, or wherein the information comprises management information related to the second track group.

6. The information recording method according to claim 5, wherein the first track is recorded to overlap on a portion of a second track, closest to the first track, among the plurality of tracks included in the first track group, and to be overlapped by a portion of a third track, closest to the first track, among the plurality of tracks included in the second track group.

7. The information recording method according to claim 5, wherein the information comprises information independent of information recorded in the first track group and information recorded in the second track group.

8. The information recording device according to claim 5, wherein the first track is configured to reduce the magnetic interference between the first track group and the second track group.

* * * * *